Apr. 3, 1923.
H. A. CARSON
RESILIENT TIRE
Filed May 12, 1921
1,450,473
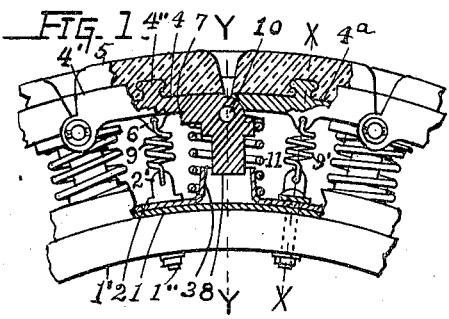
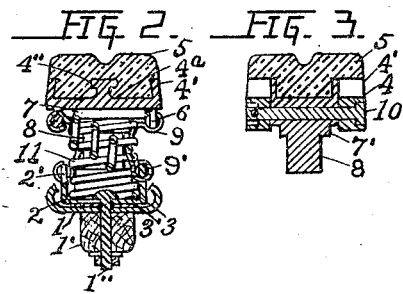
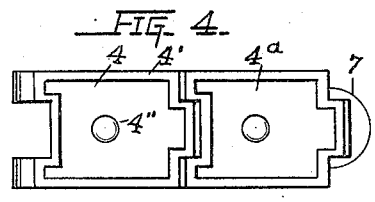
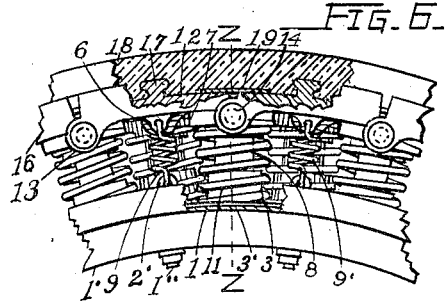
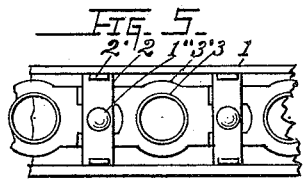
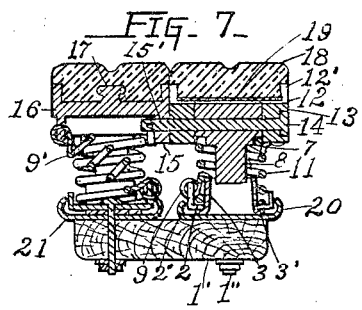
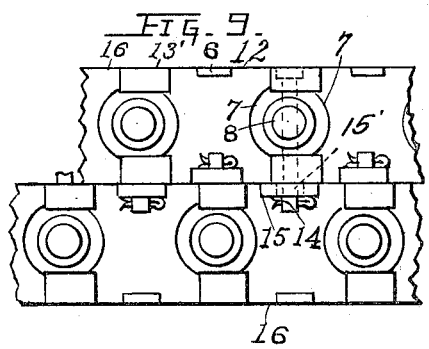
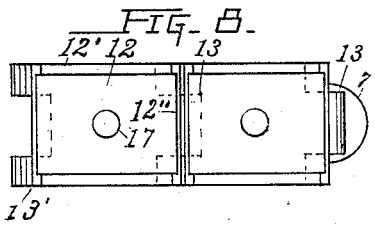
Inventor
Henry A. Carson.
George W. Hinton.
Attorney Patented Apr. 3, 1923.

1,450,473

UNITED STATES PATENT OFFICE.

HENRY A. CARSON, OF ST. JOSEPH, MISSOURI.

RESILIENT TIRE.

Application filed May 12, 1921. Serial No. 469,010.

*To all whom it may concern:*

Be it known that I, HENRY A. CARSON, a citizen of the United States, residing at St. Joseph, in the county of Buchanan and State of Missouri, have invented certain new and useful Improvements in Resilient Tires, of which the following is a specification, reference being had therein to the accompanying drawing.

My invention relates to improvements in resilient tires, for use on vehicle wheels, and the present application is a substitute for my application Serial No. 184,520, which became abandoned May 12, 1921. The objects of the invention are, to provide a simple, substantial and durable tire of this class, which can readily be attached to the ordinary wheel rims, now generally in use, and in which the shock to the tire, which arises from contact with an obstacle, shall be absorbed, practically at the point of contact, by the minimum number of parts.

Further objects are, to so construct a resilient tire, that spiral springs, only, shall be used, thereby avoiding the crystallization and breaking of springs, which is experienced in using springs of other forms. Still further objects are, to construct the tire of separable units, in such manner, that the units can readily be replaced at small cost, and to provide means whereby the lateral movement of the rim is limited.

I attain these objects by the mechanism illustrated in the accompanying drawings, in which:

Figure 1 is a fragmentary side view of the tire, certain portions being broken away. Fig. 2 is a transverse section on the line X X, seen in Fig. 1. Fig. 3 is a transverse section on the line Y Y, seen in Fig. 1, looking toward the left, showing the hinging means in detail. Fig. 4 is a view in detail of the outer surface of two of the links, the elastic tread blocks being removed. Fig. 5 is a view in detail, of the outer surface of the rim, with the guide sleeves and spring connections secured thereon. Fig. 6 is a side view of a portion of one of the various other forms in which the tire may be made, certain parts being broken away. Fig. 7 is a transverse section, on the line Z Z, looking toward the right.

Fig. 8 is a view of the outer surface in detail, of two of the links, seen in Fig. 6. Fig. 9 is a view in detail, of the inner surface of a plurality of the links seen in Fig. 6.

Referring to Figs. 1 and 2, the rim 1 is secured on the ordinary felly 1', by the bolts and nuts 1''.

Said bolts 1'' are passed through angle plates 2 mounted upon the rim 1, the base portions 3' of the guide sleeves 3, the rim 1 and the felly 1', nuts being threaded on said bolts 1, for securing said parts tobether. The ends of said angle plates are bent outward and an eye 2' is formed on one end of each angle plate 2.

The outer rim comprises a plurality of pairs of links 4 and 4ª, as seen in Fig. 4. An outwardly extending flange 4' is formed on the longitudinal and transverse edges of each one of said links 4 and 4ª, for holding an elastic tread block 5 thereon, as seen in Figs. 1 and 2. A headed stud 4'' is formed on the central portion of the outer surface of each one of said links 4 and 4ª, for assisting in holding said tread blocks 5 in place, which latter are formed and vulcanized in the position shown. An eye 6 is formed on one of the inner edges of each one of said links 4 and 4ª; the eye on one link being formed on one edge thereof, and the eye on the adjacent links on the opposite edges. This alternation of the position of said eyes 6, extends around the entire chain of links; hence said links are formed in pairs. A spring boss 7 is formed on the inner surface of one end portion of each one of said links 4 and 4ª. A guide stud 8 is formed on the center of each one of said bosses 7 and extends inward therefrom. The extended end portions of said studs 8 are loosely guided in their respective guide sleeves 3, for limiting lateral and longitudinal movement of said sleeves 3 and their connected parts, in relation to their respective links 4 and 4ª.

The outer end of an inclined spring 9 is hooked into the eye 6, and the inner end of said spring 9 is similarly connected with the eye 2', for yieldably holding the therewith connected rim 1 against lateral movement in one direction. The adjacent link 4ª is similarly provided with the oppositely inclined spring 9', for performing the same function in the opposite direction.

The links 4 and 4ª are hinge connected by the hinge bolt 10, which passes through apertures formed through said links 4 and 4ª.

A spiral spring 11 encircles the sleeve 3 and the stud 8.

The inner end of said spring 11 presses against the base portion 3′ of said sleeve, and the outer end of said spring presses against the spring boss 7, for yieldably holding the adjacent ends of said links 4 and 4ª in their outward position.

Each one of said links 4 and 4ª is similarly provided with a spring 11, thereby normally pressing all of said links outward and yieldably holding them at an equal distance from the rim 1.

In operation of the tire, with the parts in the position seen in Fig. 1, when the tread block 5 of the link 4 or the link 4ª, or both of said tread blocks are moved into contact with an obstacle, such as a rock or other irregularity in the surface of the road, said tread blocks 5 and their respectively connected links and the therewith connected parts are thereby depressed toward the rim 1, at the point of contact, overcoming the spring 11.

While this takes place, said depressed links 4 and 4ª, by their hinge connections 10 with their adjacent links 4 and 4ª, move the latter outward, thereby compensating for the inward movement of said depressed links. After the latter have moved from said obstacle, their spring 11 forces them outward, thereby moving all of the links into their normal position.

Should the vehicle (not shown,) and the therewith connected felly 1′ and the rim 1, be moved laterally in either direction, the inclined springs 9 and 9′, yieldably resist said movement, until the same is stopped by contact of the inner end portion of the stud 8 with the sleeve 3. Should the felly 1′ and the therewith connected rim 1, carrying the sleeve 3, move longitudinal with greater speed than the described links 4 and 4ª and the therewith connected parts, or vice versa, said movement is limited and ultimately stopped in the same manner.

While I have shown the links 4 and 4ª, of such from as is adapted to hold the tread blocks 5 thereon, and to be used as a portion of a single tire, it is evident that said links 4 and 4ª could be so modified in form, as to adapt them to hold an endless elastic tread and to be used in forming a double tire, without departing from the spirit of my invention; which I reserve the right to do.

One of such other forms of links is shown in Figs. 6 to 9, inclusive, in which the link 12 has the outwardly extending flanges 12′ formed on its longitudinal edges. The transverse edges 12″ of said link 12 are straight, on which edges the hinge projections 13 and 13′ are formed. Said projections 13 and 13′ interlap, as indicated by dotted lines in Fig. 8, and are hinged together by the bolt 14, seen in Fig. 7. The end of the bolt 14 is provided with a cotter pin 14′, passed therethrough, for holding said bolt in place, while the outer end of said bolt 14 is countersunk in the link 12, for preventing said bolt from being moved into contact with objects, such as rocks and other irregularities in the surface of the road.

The headed stud 17 (see Figs. 6 and 8,) is formed on the central portion of the outer surface of the link 12, for assisting in holding the endless elastic tread 18 on said link.

Said tread 18 is formed and vulcanized on said outer surface, between the flanges 12′, for holding said tread in place.

A piece of fabric 19 (or the like,) is placed over the space between the transverse edges of the link 12 and the longitudinally adjacent links, for preventing entry into said space, of the material of said endless tread 18, when the same is formed and vulcanized thereover.

The links 12 and 16 form two endless chains connected together by the bolts 14 which extend through the lugs 13 and 13′ of the links 12 and holes 15′ in projections 15 on the links 12 and 16, Figs. 7 and 9. The two endless chains extend around their respective rims 20 and 21, and since their undescribed parts are substantially the same as the parts of the previously described link 4, and operate in the same manner, they are similarly designated, and further description is deemed unnecessary.

From the foregoing it will be seen and understood that either a chain of the links 12 or of the links 16, could be used in forming a single tire, having the endless elastic tread 18 formed thereon, and that a plurality of the links 4 and 4ª could be made with the holding lugs 15 formed thereon, thereby adapting them to be used in forming a double tire, having elastic tread blocks secured thereon; which I reserve the right to do.

Having fully described my invention, what I claim as new, and desire to secure by Letters Patent is:

1. In a resilient tire; a plurality of links hinged together forming an annular endless chain around the rim of a vehicle wheel with a space of predetermined depth between said links and rim; springs in said space for pressing said links outward from said rim; guiding and retaining means connected with said links and rim whereby said springs are guided and retained in place and whereby said links are loosely guided through their inward and outward movement; and yieldable resisting means connected with said links and rim for yieldably resisting lateral movement of said rim in relation to said links.

2. A resilient tire comprising a plurality of links hinged together forming an annular endless chain around the rim of a vehicle wheel with a space between said rim and links; a spring boss formed on each one of said links; a like plurality of sleeves secured on said rim; a guide stud formed with each one of said bosses the inner end portions of said studs being loosely guided in their respective sleeves; a spiral spring mounted on each one of said studs and its respective sleeve, the inner end of said spring resting upon the base portion of said sleeve and its outer end pressing against said spring boss; inclined springs for yieldably resisting lateral movement of said links; connecting means on said links whereby the outer ends of said springs are connected with said links; and rim connecting means whereby the inner ends of said inclined springs are connected with said rim.

3. In a resilient tire; a plurality of links hinged together forming a pair of annular endless chains each one of which encircles the rim of a vehicle wheel with a space between each one of said rims and its respective chain of links; resilient means interposed between said endless chains and the rims; a like plurality of inclined spiral springs alternately inclined in opposite directions for yieldably holding said links against lateral movement; holding means whereby the links of said two chains are held against movement from each other; and an elastic tread on the outer surface of each one of said chains of links In testimony whereof I affix my signature.

HENRY A. CARSON.